United States Patent
Schroeder et al.

(10) Patent No.: US 8,659,978 B2
(45) Date of Patent: Feb. 25, 2014

(54) MEMORY CARD PROGRAMMABLE TIMER DEVICE AND METHOD

(75) Inventors: Jeff Schroeder, Lake Zurich, IL (US); Richard Lowell Thorne, Elgin, IL (US); Keith Dice, Naperville, IL (US)

(73) Assignee: Prince Castle, Inc., Carol Stream, IL (US)

( * ) Notice: Subject to any disclaimer, the term of this patent is extended or adjusted under 35 U.S.C. 154(b) by 1125 days.

(21) Appl. No.: 11/938,362

(22) Filed: Nov. 12, 2007

(65) Prior Publication Data

US 2009/0125682 A1 May 14, 2009

(51) Int. Cl.
*G04B 47/00* (2006.01)
*G04F 8/00* (2006.01)
*A23C 3/02* (2006.01)
*F27D 11/00* (2006.01)

(52) U.S. Cl.
USPC ............... 368/10; 368/107; 99/483; 219/385; 426/418

(58) Field of Classification Search
USPC ............... 368/7, 9, 10, 107–110; 340/309.16; 99/468, 483, 486; 219/385; 426/418, 426/520
See application file for complete search history.

(56) References Cited

U.S. PATENT DOCUMENTS

| | | | | |
|---|---|---|---|---|
| 4,695,954 A * | 9/1987 | Rose et al. | ....................... | 221/15 |
| 4,841,125 A * | 6/1989 | Edamura | ....................... | 219/506 |
| 4,972,060 A * | 11/1990 | Edamura | ....................... | 219/714 |
| 5,274,209 A * | 12/1993 | Edamura | ....................... | 219/714 |
| 5,317,134 A * | 5/1994 | Edamura | ....................... | 219/720 |
| 5,408,443 A * | 4/1995 | Weinberger | ....................... | 368/10 |
| 5,691,932 A * | 11/1997 | Reiner et al. | ....................... | 368/10 |
| 6,011,243 A * | 1/2000 | Arnold et al. | ....................... | 219/506 |
| 6,032,085 A * | 2/2000 | Laurent et al. | ....................... | 700/242 |
| 6,048,087 A * | 4/2000 | Laurent et al. | ....................... | 700/242 |
| 6,281,798 B1 * | 8/2001 | Laurent et al. | ............. | 340/573.1 |
| 6,294,999 B1 * | 9/2001 | Yarin et al. | ................ | 340/573.1 |
| 6,388,238 B2 * | 5/2002 | Head | ............................. | 219/702 |
| 6,421,650 B1 * | 7/2002 | Goetz et al. | ....................... | 705/3 |
| 6,587,958 B1 * | 7/2003 | Oshins et al. | ................ | 713/502 |
| 6,934,220 B1 * | 8/2005 | Cruitt et al. | ..................... | 368/10 |
| 6,949,729 B1 * | 9/2005 | Ishikawa et al. | ............. | 219/702 |
| 7,151,968 B2 * | 12/2006 | Williamson | ..................... | 700/65 |
| 7,376,485 B2 * | 5/2008 | Salerno | ......................... | 700/211 |
| 2002/0028063 A1 * | 3/2002 | Haneda et al. | .................. | 386/83 |
| 2002/0085023 A1 * | 7/2002 | Zustak et al. | .................. | 345/733 |
| 2003/0198137 A1 * | 10/2003 | Gorden | ........................... | 368/12 |
| 2004/0056761 A1 * | 3/2004 | Vaseloff et al. | .......... | 340/309.16 |
| 2005/0211775 A1 * | 9/2005 | Vaseloff et al. | ............... | 235/385 |
| 2005/0216349 A1 * | 9/2005 | Vaseloff et al. | ................. | 705/15 |
| 2007/0036036 A1 * | 2/2007 | Kadish et al. | ................. | 368/230 |
| 2007/0199931 A1 * | 8/2007 | Vaseloff et al. | ............... | 219/388 |

OTHER PUBLICATIONS

Frymaster HCP Installation andOperation Manual, Dec. 2006, pp. 1-1 to 10-4, Dec. 2006.*

* cited by examiner

*Primary Examiner* — Vit W Miska

(74) *Attorney, Agent, or Firm* — Marshall, Gerstein & Borun LLP

(57) ABSTRACT

A timing device, that may be used in connection with food preparation, holding or service equipment, is programmable via a portable, replaceable media. In particularly, the timing device may be adapted to receive or associate with a media containing a set of instructions to affect operation of the timing device. Upon association with the timing device, transfer of the programming instructions from the media to the timing device occurs affecting programming of the timing device.

17 Claims, 4 Drawing Sheets

MEMORY CARD PROGRAMMABLE TIMER DEVICE AND METHOD

TECHNICAL FIELD

This patent relates to the field of timer devices, and in particular, to multifunction food product timers used in connection with the storing, preparation, holding and service of food items.

BACKGROUND

The food service industry has long used timer devices in connection with the preparation and service of food products. Timers, for example, are used to measure the preparation time of a food product or to measure the holding time of food product before service. One such timer device is disclosed and described in the commonly assigned U.S. Pat. No. 7,258,064, the disclosure of which is hereby expressly incorporated by reference.

Each food product has its own unique set of storage, preparation and holding parameters. Timers, such as that disclosed in the aforementioned U.S. Pat. No. 7,258,064 are programmed for a menu of food items. Selection of a particular food item retrieves the desired parameters from an on-board or networked memory. Alternatively, parameters for a food item may be entered manually for each food item. Programming of the timer, i.e., placing the parameter into the memory, may be accomplished by placing the timer in a programming mode and entering programming data via an interface integral with the timer, by coupling a programming device to enter the programming data, by transmitting by wired or wireless interface the programming data from a portable computing device, e.g., a handheld, laptop or similar computer device, information to the timer or by coupling the timer to a network to receive the programming data via the network.

Menu flexibility, such as offering daily specials, necessitates periodic and potentially frequent reprogramming of the timers. As appreciated from the foregoing discussion, programming requires a certain level of skill on the part of the programmer, whether placing the timer in a programming mode and entering data or coupling the timer to a programming device or computing device and then operating a function to affect programming. Networking the timers requires providing the timers with network interfaces, increasing the cost of the device and providing network communications to several dozen timers within the facility.

DETAILED DESCRIPTION

A timing device, that may be used in connection with food preparation, holding or service equipment, is programmable via a portable, replaceable media. In particularly, the timing device may be adapted to receive or associate with a media containing a set of instructions to affect operation of the timing device. Upon association with the timing device, transfer of the programming instructions from the media to the timing device occurs affecting programming of the timing device. Data may also be transferred from the timing device to the media.

Figure 1:
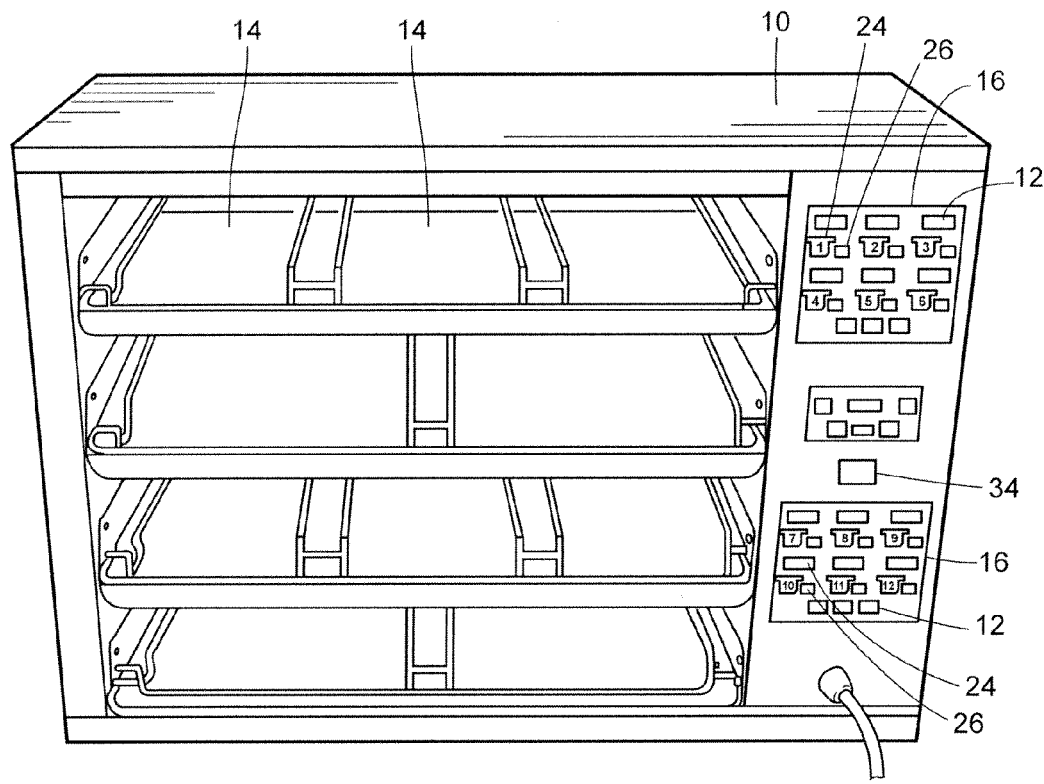
FIG. 1 is a front perspective view of a food holding device having display devices adjacent associated food holding compartments associated with one or more timers.

Referring to FIG. 1, a food storage device 10 that may be used in a food preparation, holding or service area of a restaurant-, commercial or institutional kitchen- and the like-type facility, includes one or more timer modules 12. Two timer modules 12 are illustrated, although fewer or more may be used depending on the size and configuration of the food storage device 10. The illustrated food storage device 10 includes twelve (12) holding areas 14, and each timer module 12 is configured to include six (6) timers 16, one each associated with a holding area 14. Alternatively a single timer module including twelve (12) timers may be provided, or three (3) or more timer modules may be provided, for example. Furthermore, one-to-one correspondence of holding areas 14 to timers 16 is not required.

The timers 16 are configured, i.e., programmed, to provide storage, preparation, holding or other timing of a food product contained within the associated holding area 14. The timing modules 12 and the individual timers 16 may be coupled via a suitable communication network (not depicted) to a processor or other centralized controller (not depicted) to provide various timing functionality including without limitation timing transfer capability between holding areas 14 of a food storage device 10 or between holding areas of different food storage devices 10, such functionality being described in the aforementioned commonly assigned U.S. Pat. No. 7,258,064.

Figure 2:
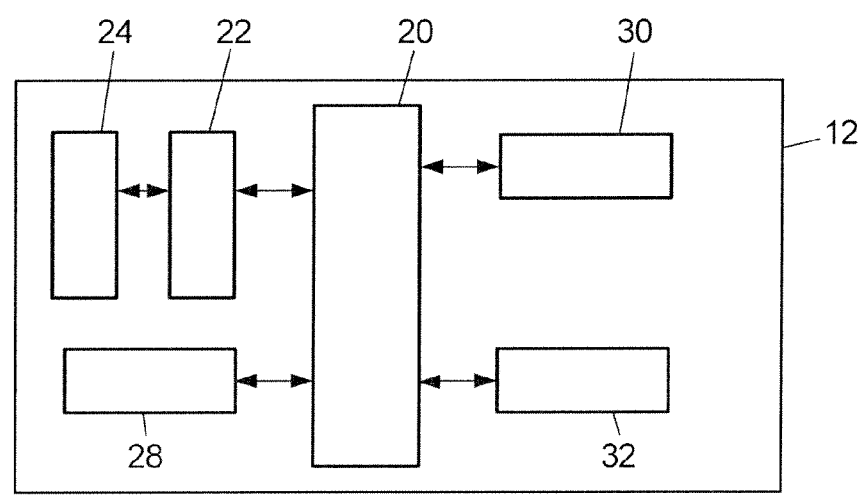
FIG. 2 is a block diagram of a timer module in accordance with the herein described embodiments of the invention.

FIG. 2 illustrates in block diagram form the timer module 12. The timer module 12 may include a processor 20, which can be a general purpose processor, a limited instruction set processor, an application specific processor or any other suitable processing device operable upon a set of instructions stored within an associated memory. The processor 20 couples to an interface controller 22 that, in turn, couples to one or more displays 24 and keypads/touch screens 26 or similar input/output devices, a media interface 28, a network interface 30 and a memory 32. The memory 32 is preferably flash memory or other suitable non-volatile, readable/rewriteable memory. The processor 20 couples to the memory 32 which may retain a set of operating instructions that the processor 20 may access in order to carry out the desired functionality of the timer module 12. In fact, much of the inventive functionality and many of the inventive principles are best implemented with or in connection with software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs as may be used in the timing modules 12, if any, will be limited and with a focus toward the principles and concepts of the preferred embodiments.

Figure 3:
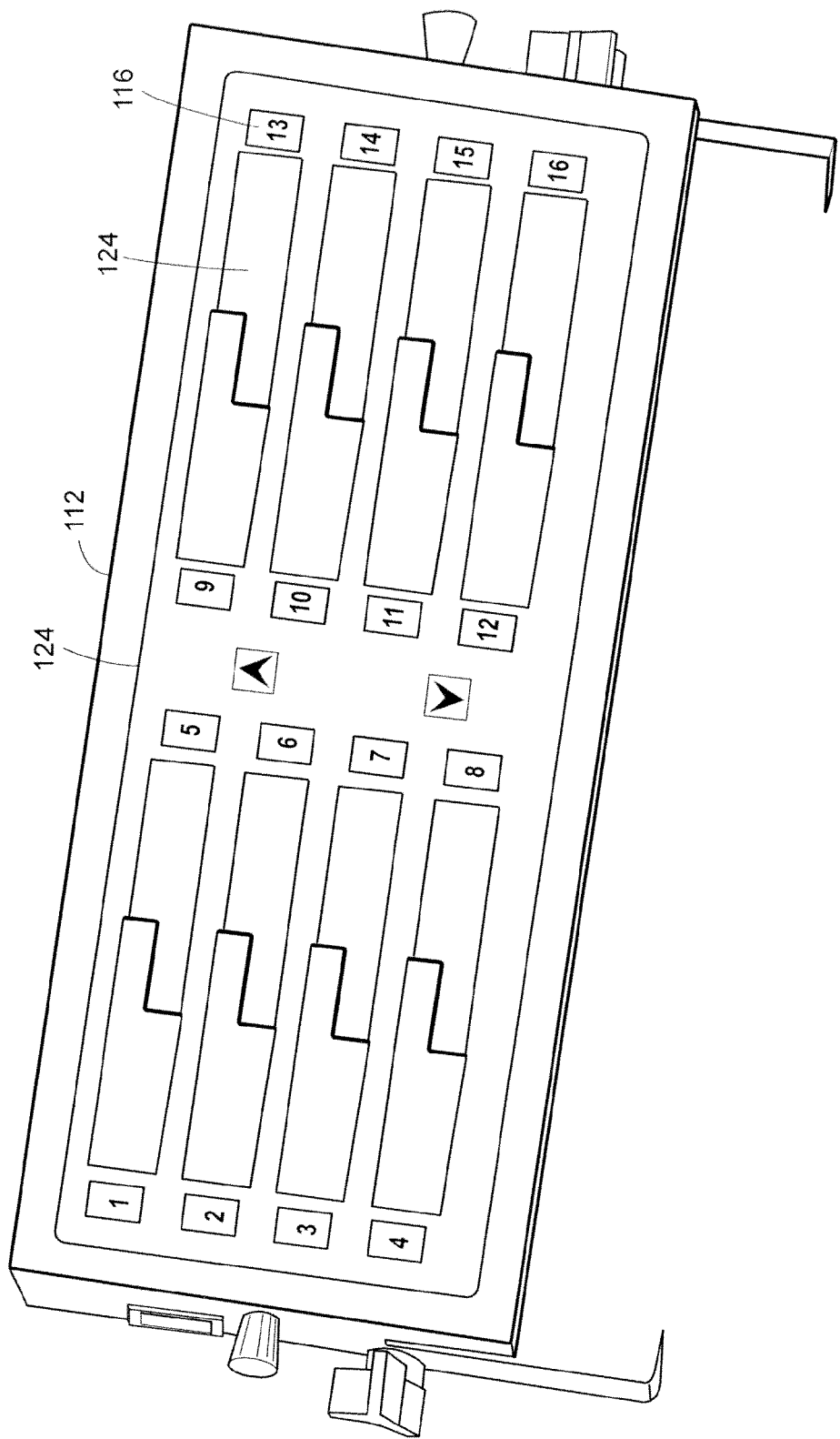
FIG. 3 is a front perspective view of a timer device in accordance with the herein described embodiments of the invention.
Figure 4:
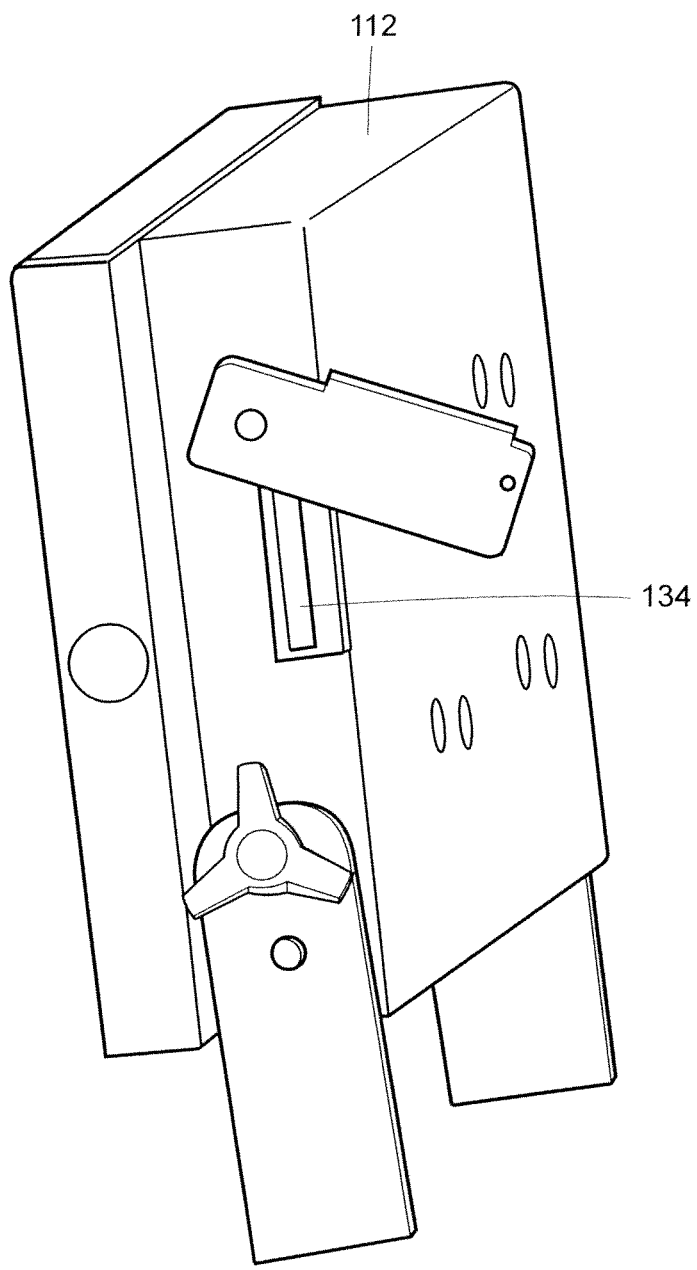
FIG. 4 is a side perspective view of the timer illustrated in FIG. 2.

FIGS. 3 and 4 illustrate an alternative embodiment timer module 112 that is not integral with a food storage device, such as the device 10. Thus the timer module 112 may be associated with any number of food storage, preparation, holding or service devices, generally referred to as food processing devices. The timer module 112 includes sixteen (16) displays associated with sixteen (16) timers 116. Each timer 116 includes a display 124 and the module 112 includes keypad 124. Upon placing a food item into a holding area associated with one of the timers 116, the operator may use the keypad 124 to set the timer 116 for the food item and start the timer 116.

To affect programming of the timer module, such as the timer module 12 or the timer module 112, a media 40 (FIG. 5) is provided. The media 40 can be virtually any type of machine readable media, and preferably a memory device that may be read electronically by the timer module. In this regard, the media 40 may be an SD memory card, Memory Stick memory card, USB flash media or virtually any other suitable media memory device, whether electronic, magnetic, optical or combinations thereof.

To associate the media 40 with the timer module, the timer module may be formed with a memory port, coupling, slot or socket, for example, the memory socket 134 shown formed on the timer module 112 that couples to the memory interface 28 internally. A suitable memory socket 34 may be formed on the timer module 12. Alternative ways of coupling the media 40 with the timer module may be employed. For example, the media 40 may be a magnetic strip on a card substrate that is swiped through a slot reader formed on the timer module. The media 40 may be contactless, e.g., radio frequency (RF) coupled to the timer module, as is accomplished with various RF identification technologies. As will be appreciated, the media 40 may be virtually any type of memory media that is portable and may be respectively associated with one or more timer modules.

A single media 40 may be used to program several timer modules or individual media 40 may be provided for each respective timer module within a facility or combinations thereof. For example, a first media 40 may be provided to program a first type of food processing device, e.g., a hot food holding device and a second media 40 may be provided for a second type of food processing device, e.g., a cold food holding device.

Figure 5:
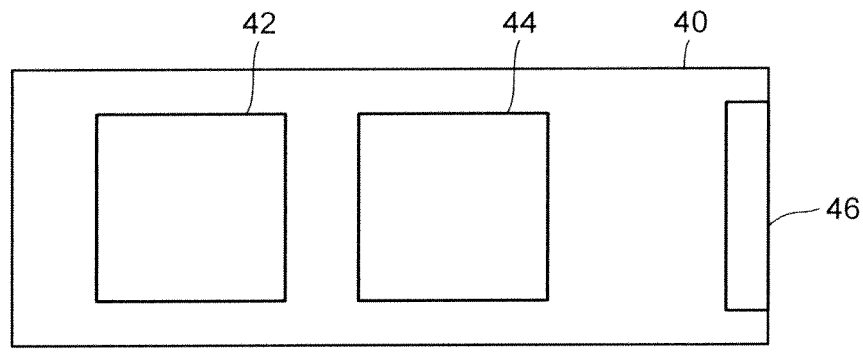
FIG. 5 is a media containing programming instructions in accordance with the herein described embodiments.

The media 40 as depicted in FIG. 5, may contain within its memory a set of instructions 42 to be transferred to the timer module and a set of instructions 44 that may control operation of the processor within the timer module to affect transfer of the instructions. Alternatively, the timer module may be configured to recognize the media 40 is resident within the port, slot or socket (34/134) and media interface 28 to read the data, i.e., the set of instructions 42 from the media 40 and to write the instructions 42 into a memory within the timer module, e.g., memory 32. In such an instance the set of instructions 44 to control operation of the processor to read the media 40 need not be present on the media 40. The media 40 further includes an interface 46 to couple the media 40 to the timer module 12/112 via the port, slot or socket (34/134) and media interface 28.

Media readers, card readers, memory card/memory stick slots and associated controller are well known, and a suitable reader may be selected. The media reader may also write data to the media 40. In this regard, operating data, maintenance date, diagnostic data collected by the timer module may be written to the media 40. The media may then be returned to the manufacturer or a maintenance organization for analysis and action.

As is appreciated, use of media 40 to affect programming of timer modules such as timer modules 12 or 112 simplifies programming, reduces the time necessary for programming and requires no specific training of the operator to affect programming. A manufacturer may therefore provide a service of providing programming media 40 to food preparation facilities. For example, after gathering information from the food preparation facility, including the number and types of food to be prepared, the number and types of food processing devices and the number and types of timer modules, the service provider may produce one or more media 40 that may be delivered to the food preparation facility to program the timer modules. The manufacturer may therefore program media at one or more workstations using instruction assembly tools operating on the workstation.

Figure 6:
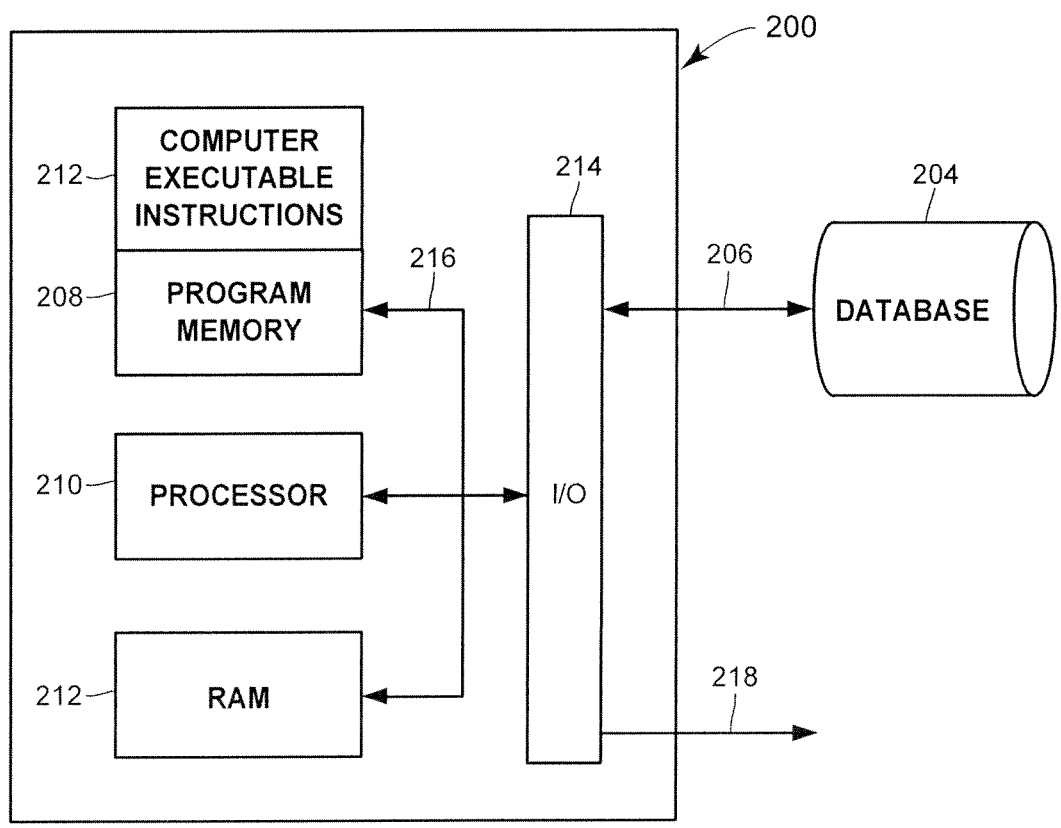
FIG. 6 is a block diagram of a work station for use in connection with the herein described embodiments of the invention.

FIG. 6 illustrates in schematic a work station 200. The work station 200 may have a controller 202 that is operatively connected to a database 204 via a link 206. It should be noted that, while not shown, additional databases may be linked to the controller 202 in a known manner, and the work station 200 itself may be linked to one or more additional work stations, networked computers or devices, servers or data storage devices via any suitable network communication link. The controller 202 may include a program memory 208, a processor 210 (may be called a microcontroller or a microprocessor) for executing computer executable instructions, a random-access memory (RAM) 212 for temporarily storing data related to the computer executable instructions, and an input/output (I/O) circuit 214 for accepting and communicating the computer executable instructions, data for producing results with the computer executable instructions that are executed on the processor 210, and the results of any executed computer executable instructions. In one embodiment, the program memory 208 includes one or more sets of tools or utilities that facilitate the generation of timer module control data, i.e., instructions sets, and writing of the instruction sets to media, such as media 40, for distribution to food preparation facilities for the programming of timer modules. Of course, many other implementations of the work station 200 are possible.

The program memory 208, processor 210, and RAM 212 may be interconnected via an address/data bus 216. It should be appreciated that although only one processor 210 is shown, the controller 202 may include multiple processors 210. Similarly, the memory may include multiple RAMs 212 and multiple program memories 208. Although the I/O circuit 214 is shown as a single block, the I/O circuit 214 may include a number of different types of I/O circuits, and in particular may include a media reader/writer interface 218 to which media 40 to be programmed may be coupled. The RAM(s) 212 and program memories 208 may be implemented as semiconductor memories, magnetically readable memories, and/or optically readable memories, for example.

A method of programming a timer module may therefore begin with an operator at a workstation providing, creating or obtaining a set of operating instructions for a timer module. For example, the operator may begin by obtaining an existing set of instructions such as a basic set of instructions, may access a library of operating instructions (contained in one or more of the workstation memories or databases), may seek operating instructions via the network, e.g., conduct an Internet search, create instructions from scratch or combinations thereof. Once the instructions for timer modules of a specific facility and/or instructions for a specific timer module within a facility are available, the instructions may be suitably formatted as a set of instruction, i.e., data to be written to a media 40. A media 40 is coupled to the workstation and a write utility may be employed to transfer and write the set of instructions to the media 40.

The media 40 so provided with a set of instructions may then be delivered, for example sent by mail or courier or carried by a manufacturer representative or other person, to the food preparation facility. The media 40 may then be associated with timer modules within the food preparation facility to transfer the set of instructions from the media 40 to the timer module. In this regard, a food preparation facility employee, manufacturer representative or other person may couple the media 40 with the timer module via the port, coupling, slot or pocket (34, 134) provided on the timer module (12, 112). Several media 40 are easily delivered via a single package and thus all of the timer modules of a food preparation facility may be quickly and easily programmed or have their programs updated. Skilled programmers may work efficiently at the work station configured to facilitate generation of instruction sets and the programming of media 40, and hence, one programmer may easily facilitate programming of numerous timer modules in disparate locations. At the food preparation facility, the timer modules are easily programmed without the intervention of specially skilled or trained personnel.

Although the foregoing text sets forth a detailed description of numerous different embodiments, it should be understood that the legal scope of the invention is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent that would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

The invention claimed is:

1. A food processing device comprising:
   a plurality of food holding areas, each food holding area in the plurality of food holding areas being arranged for preparing a food product; and
   a timer module, the timer module including a plurality of timers, each timer being associated with a food holding area in the plurality of holding areas, the timer module including a processor and a memory coupled to the processor; the memory comprising a set of instructions to implement a set of preparation parameters associated with the food product, the timer module including a memory socket that couples to an internal memory interface;
   wherein the set of instructions to implement the set of preparation parameters is obtained from a media coupled to the timer module, and the media is one of a SD memory card, a memory stick, and a USB memory device, and another set of instructions that controls the operation of the processor to affect transfer of the set of instructions to implement the set of preparation parameters is also obtained from the media.

2. The food processing device of claim 1, further comprising the media, the media comprising a portable memory device.

3. The food processing device of claim 1, the timer module comprising a media coupling configured to receive the media and operably couple the media to the processor.

4. The food processing device of claim 3, the media coupling comprising an electrically coupling of the media to the processor.

5. The food processing device of claim 1, further comprising a first media including a first set of food processing instructions for programming a first type of food processing device and a second media including a second set of food processing instructions for programming a second type of food processing device.

6. The food processing device of claim 5, wherein the first type of food processing device is a hot food holding device.

7. The food processing device of claim 5, wherein the second type of food processing device is a cold food holding device.

8. The food processing device of claim 1, further comprising an interface controller operatively connected to the processor.

9. The food processing device of claim 8, further comprising an input/output device operatively coupled to the interface controller.

10. The food processing device of claim 8, wherein the input/output device is on one of a keypad and a touch screen.

11. The food processing device of claim 8, further comprising a media interface.

12. The food processing device of claim 8, further comprising a network interface.

13. The food processing device of claim 1, wherein the timer module is non-integral with the plurality of food holding areas.

14. A method of programming a timer module of a food processing device of a food preparation facility comprising:
   providing a media containing a first set of instructions to implement a set of preparation parameters associated with a food product for the timer module, and a second set of instructions to control the operation of a processor within the timer module to affect transfer of the first set of instructions, the media comprising one of a SD memory card, a memory stick or a USB memory device;
   coupling the media to the timer module by inserting the media into a memory socket that couples to a memory interface;
   transferring the set of instructions from the media to a memory within the timer module;
   associating a timer in the timer module with a holding area of the food processing device; and
   writing one of maintenance data and diagnostic data to the media, the maintenance and diagnostic data being collected by the timer module and stored on the memory.

15. The method of claim 14, wherein providing the media comprises delivering by mail the media to the food preparation facility.

16. The method of claim 14, wherein providing the media comprises generating the set of instructions at a workstation and transferring the set of instructions from the workstation to the media.

17. The method of claim 14, wherein the media comprises a portable memory device.

* * * * *